Nov. 7, 1950 D. T. LAWSON 2,529,401
RETRACTABLE UNDERCARRIAGE FOR AIRCRAFT
Filed Aug. 23, 1948 3 Sheets-Sheet 3

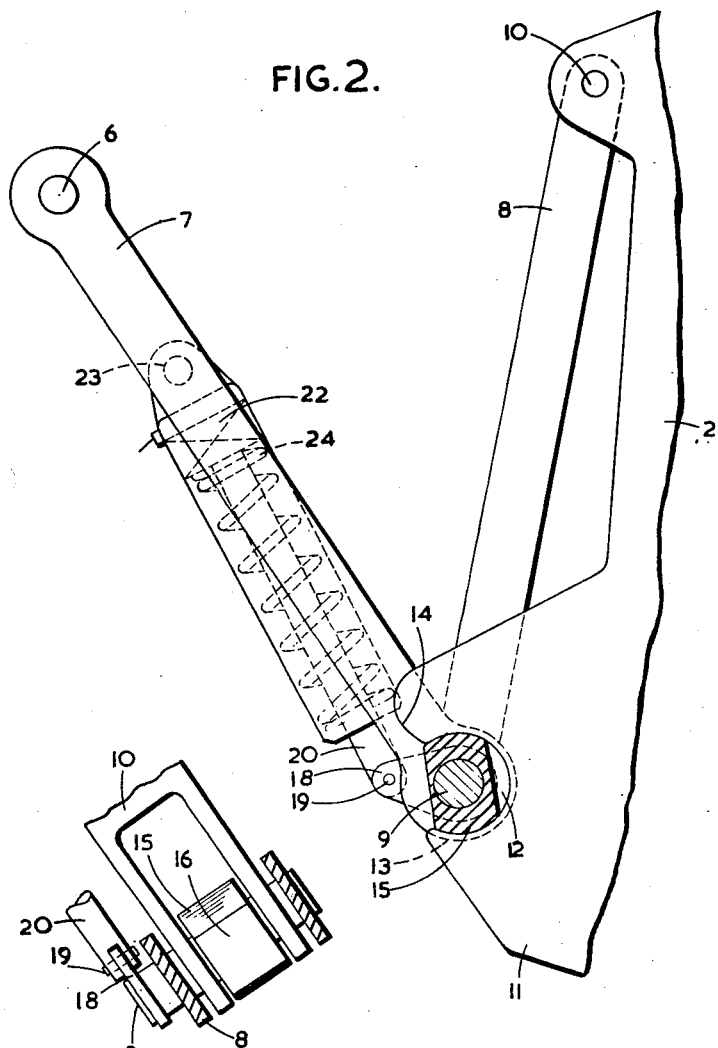

Inventor:
Derek Tom Lawson;
By his attorneys,
Baldwin, Wight, & Brevost

Patented Nov. 7, 1950

2,529,401

UNITED STATES PATENT OFFICE 2,529,401

RETRACTABLE UNDERCARRIAGE FOR AIRCRAFT

Derek Tom Lawson, Liverpool, England, assignor to Electro-Hydraulics Limited, Warrington, England, a company of Great Britain Application August 23, 1948, Serial No. 45,763
In Great Britain August 25, 1947

4 Claims. (Cl. 244—102)

This invention relates to retractable undercarriages for aircraft and in such undercarriages it is known to provide one or more structural members hinged together at some mid-point in their length, the arrangement being such that when the undercarriage is retracted the structural member or members is or are moved about their hinge to a folded position. At the present time due to the fact that the structural members have to take landing loads of the aircraft said members are of considerable length and have to be sufficiently strong to take the loads and hence are of considerable weight.

One of the objects of the present invention is to provide a structural member for retractable undercarriages, which member can have its weight reduced, a part only of the structural member being called upon to take the landing loads. Another object of this invention is to provide an efficient locking device for the undercarriage when in its lowered position.

In a retractable undercarriage according to one feature of the present invention there is provided a foldable structural member comprising a drag link, which takes the load, and a radius link pivoted together and pivotally attached one to the aircraft and the other to the wheel shock absorber, the arrangement being such that when the undercarriage is lowered, the structural member is folded, the said member being extended when the undercarriage is raised.

According to another feature of the invention the drag link has pivotally attached to it a subsidiary jack, the piston rod of which is pivotally attached to a member adapted to be moved into and out of locking position with the undercarriage leg, the locking member being rotatable about the pivot connection between the drag link and radius link.

Preferably the locking member comprises a short cylinder having two opposed flats on its outer surface, whilst the locking member is adapted to be moved into engagement with an annular recess in the undercarriage leg. The recess preferably is formed as an annular recess on an arm fast with the shock absorber, thus providing on the arm two hook-shaped jaws, one of which is formed with a flat at the entry of its recess.

Figure 1:
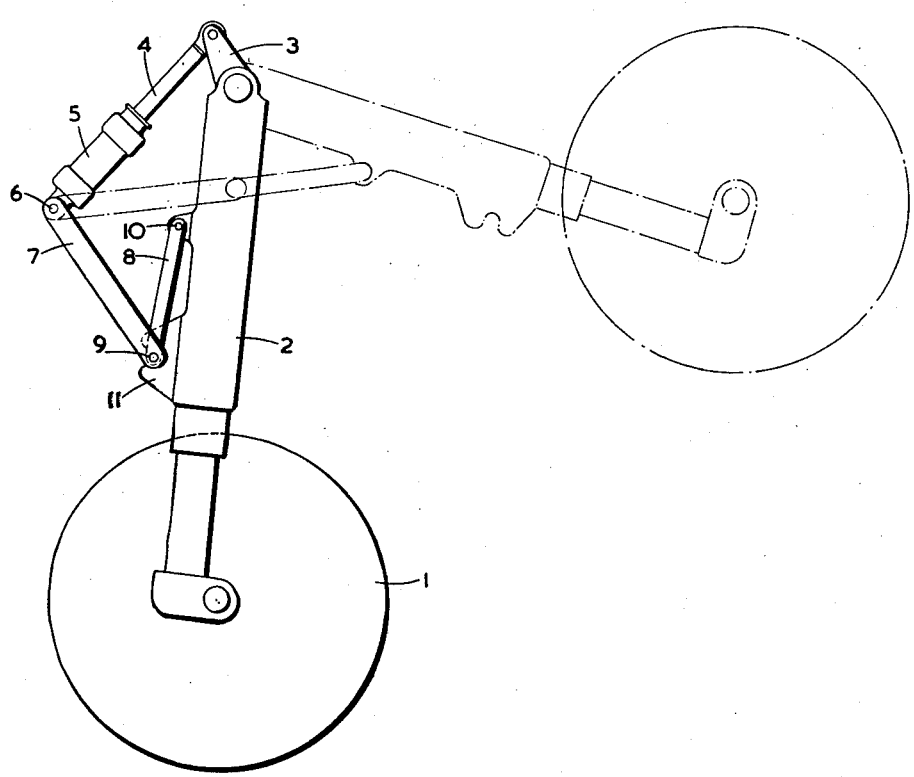
Figure 4:
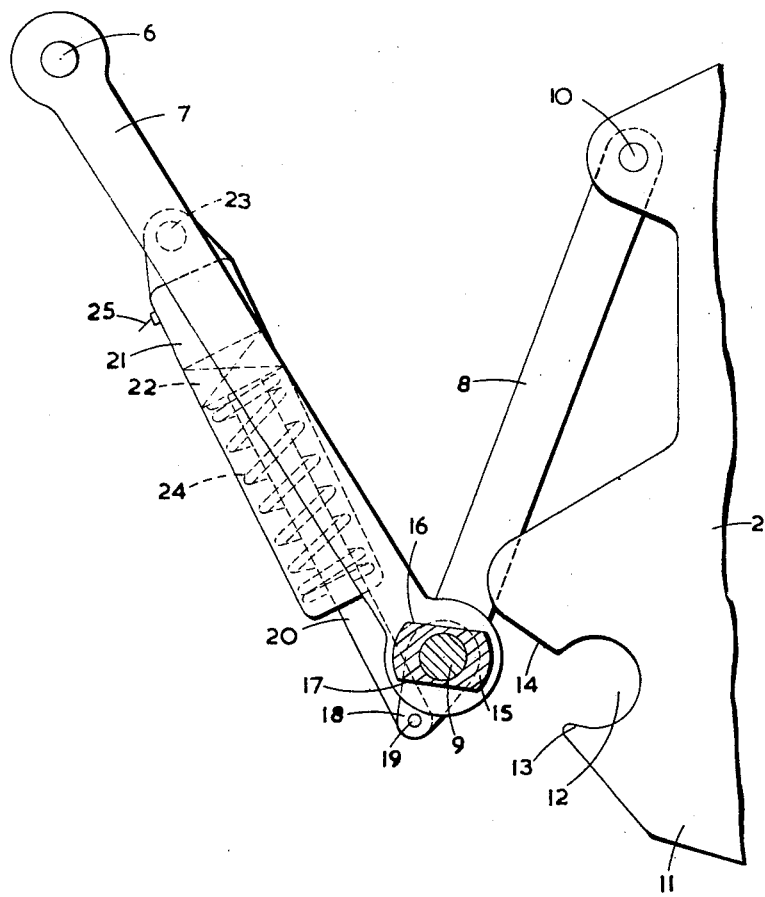

The invention is illustrated diagrammatically in the accompanying drawings in which Figure 1 shows the undercarriage in its lowered position, the retracted position being also shown but in dotted lines; Figure 2 shows in fragmentary view the drag link in the locked position, whilst Figure 3 is a detail of the locking mechanism. Figure 4 shows also as a fragmentary view the drag link as it disengages from the locked position; Figures 2, 3 and 4 are drawn to a larger scale.

Referring to the drawings the wheel 1 of an undercarriage is pivotally connected to the aircraft by an undercarriage leg, in the form shown constituted by a pin and carried by a resilient shock absorber 2. Attached to the upper part of the leg 2, or integral therewith, is a crank lever 3 to which is pivotally attached the piston rod 4 of the undercarriage jack 5, the cylinder of which is pivotally attached to the aircraft by a pin 6 which is fixed with respect to the aircraft and which serves as the pivot for the drag link 7 of the structural member. The radius link 8 of the structural member is pivotally connected by a pin 9 to the drag link at one end and its other end is pivotally attached as at 10 to the shock absorber 2. The shock absorber leg is provided with an arm part 11 fixed with respect to the leg and provided with an annularly recessed locking part 12, the opening to which is made smaller than the internal diameter of the recess, thus forming two hook-shaped jaws 13, 14, the latter being provided with a flat. Rotatably mounted on the pivot pin 9 between the drag link and radius link is a locking part 15 comprising a short cylinder having on opposed outer surfaces two flats, 16, 17 (Figure 4) allowing it to pass through the mouth of the annular recess 12. Attached to the locking member 15 is a lever arm 18 which is pivotally attached by a pin 19 to the piston rod 20 of an auxiliary jack 21, the piston 22 of which is free to slide in the jack which in turn is pivotally attached by a pin 23 to the drag link 7. In the auxiliary jack cylinder is a spring 24 which normally maintains the piston 22 at one end of the cylinder and the locking member 15 in the locked position. When the main jack 5 is operated to cause lowering of the undercarriage the flat surface 16 on the locking member 15 is brought into firm contact with the flattened jaw 14 of the mouth of the recess 12, thereby turning the locking member against the load of the spring 24 in the auxiliary jack 21 and allowing the said locking member to pass through the mouth into the recess, so that the drag link 7 and radius link 8 are held locked, the force of the spring returning the locking member to its former position so that the hook jaw 13 of the recess maintains the locking member in the recess.

When it is desired to retreat the undercarriage fluid or gas pressure is supplied through a connection 25 into the auxiliary jack cylinder moving its piston rod 20 and hence the lever 18 pivotally attached thereto downwards so as to allow the locking member to be rotated to pass out of the recess.

It will be appreciated that when the undercarriage is in the lowered position the drag link and radius link are moved about their pivots so as to be in the folded position, but when the undercarriage is retracted movement thereof also causes the drag link and radius link to move to the extended or unfolded position.

What I claim is:

1. In a retractable undercarriage for aircraft, an undercarriage leg mounted on the aircraft for movements to lowered and to retracted positions; a foldable structure comprising a drag link, a radius rod, and means pivotally connecting one end of said drag link to one end of said radius rod; means fixed with respect to said aircraft pivotally connecting the other end of said drag link directly to the aircraft; means pivotally connecting the other end of said radius rod to said leg; a part fixed with respect to said leg; and a part on said drag link directly engageable with said part fixed with respect to said leg when said leg is in lowered position, whereby landing load is transmitted from said leg through said drag link to said aircraft without being transmitted through said radius rod.

2. In a retractable undercarriage for aircraft, an undercarriage leg mounted on the aircraft for movements to lowered and to retracted positions; a foldable structure comprising a drag link, a radius rod, and means pivotally connecting one end of said drag link to one end of said radius rod; means fixed with respect to said aircraft pivotally connecting the other end of said drag link directly to the aircraft; means pivotally connecting the other end of said radius rod to said leg; a part fixed with respect to said leg; and a part on said drag link at its point of pivotal connection to said radius rod directly engageable with said part fixed with respect to said leg when said leg is in lowered position, whereby landing load is transmitted from said leg through said drag link to said aircraft without being transmitted through said radius rod.

3. In a retractable undercarriage for aircraft, an undercarriage leg mounted on the aircraft for movements to lowered and to retracted positions; a foldable structure comprising a drag link, a radius rod, and means pivotally connecting one end of said drag link to one end of said radius rod; means fixed with respect to said aircraft pivotally connecting the other end of said drag link directly to the aircraft; means pivotally connecting the other end of said radius rod to said leg; a locking part fixed with respect to said leg; a rotatable locking member on said drag link directly engageable with said locking part fixed with respect to said leg when said leg is in lowered position, whereby landing load is transmitted from said leg through said locking part, said locking member, and said drag link to said aircraft without being transmitted through said radius rod; and a jack pivotally mounted on said drag link and operatively connected to said locking member.

4. A construction as set forth in claim 3 in which the locking part is formed as an annular recess in the undercarriage leg, and the locking member comprises a rockable cylinder having two opposed flats on its outer surface adapted to be received in said recess and then rocked to effect locking of the drag link to the leg.

DEREK TOM LAWSON.

REFERENCES CITED

The following references are of record in the file of this patent:

UNITED STATES PATENTS

| Number | Name | Date |
|--------|------|------|
| 2,294,467 | Lemonier | Sept. 1, 1942 |
| 2,346,977 | La Sha | Apr. 8, 1944 |
| 2,391,998 | Palmer | Jan. 1, 1946 |
| 2,467,015 | Dreifke | Apr. 12, 1946 |